United States Patent
Rigazio et al.

(10) Patent No.: US 6,571,174 B2
(45) Date of Patent: May 27, 2003

(54) APPARATUS FOR EFFICIENT DISPATCH AND SELECTION OF INFORMATION IN LAW ENFORCEMENT APPLICATIONS

(75) Inventors: Luca Rigazio, Santa Barbara, CA (US); Philippe R. Morin, Santa Barbara, CA (US); Jean-Claude Junqua, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/929,634

(22) Filed: Aug. 14, 2001

(65) Prior Publication Data

US 2003/0040865 A1 Feb. 27, 2003

(51) Int. Cl.[7] ................. G01C 21/34; G06F 19/00
(52) U.S. Cl. ................ 701/209; 701/117; 342/357.07; 342/357.09
(58) Field of Search ................ 701/209, 211, 701/117; 340/995; 342/357.07, 357.09

(56) References Cited

U.S. PATENT DOCUMENTS

| | | | |
|---|---|---|---|
| 5,689,809 A | * | 11/1997 | Grube et al. ........... 340/995 |
| 6,021,371 A | * | 2/2000 | Fultz ..................... 340/988 |
| 6,185,503 B1 | * | 2/2001 | Sumizawa ............. 340/988 |
| 6,317,684 B1 | * | 11/2001 | Roeseler et al. ...... 340/990 |

\* cited by examiner

*Primary Examiner*—Michael J. Zanelli
(74) *Attorney, Agent, or Firm*—Harness, Dickey & Pierce, PLC

(57) ABSTRACT

A navigation apparatus is disclosed which may be used by law enforcement personnel for rapid intervention to a location while adding safety and reliability to the process. The apparatus includes a computer system, having an operating system, memory and a user interface. The system further includes a positioning system, such as a GPS system for determining the position of a vehicle. The positioning system communicates with the operating system. An information database, communicating with the operating system, contains data related to routing information concerning routes for travel by the vehicle. The routing information includes safety information concerning route safety in the traveling region accessible by the vehicle. The apparatus further includes a routing system in communication with the operating system that determines a route based at least in part on the routing information. Driving directions and call information are provided multi-modally to provide the officer with critical information in an efficient and timely fashion.

21 Claims, 3 Drawing Sheets

APPARATUS FOR EFFICIENT DISPATCH AND SELECTION OF INFORMATION IN LAW ENFORCEMENT APPLICATIONS

FIELD OF THE INVENTION

The present invention relates generally to vehicle dispatch and navigation and relates particularly to speech recognition dialogue systems.

BACKGROUND OF THE INVENTION

Vehicle route guidance systems are becoming an increasingly common feature in today's motor vehicles. Advanced vehicle route guidance systems take advantage of a global positioning system's tracking capability to sense a vehicle location, determine the location of an anticipated vehicle maneuver, and to give instructions with speech generation, taking into account such things as vehicle speed, performance characteristics of the vehicle, and driver instruction timing preferences.

In planning a route for travel, such systems take certain attributes into consideration such as traffic congestion, concentration, intensity of traffic, and driver preferences. Such systems, however, typically cater to the needs of the commuter or traveling business person. Hence, these systems are not particularly suited for use in an emergency dispatch and navigation system involving multiple vehicles such as patrol vehicles used by law enforcement personnel.

Currently an officer responding to a call for assistance relies on his partner or "co-pilot" to locate an address on a map and provide instructions for navigation. Officers responding to such calls typically drive at faster than normal speeds and thus require instructions that anticipate the rapidity of vehicle maneuvers. An officer engaged in such rapid travel may generally rely on the supplemental knowledge of the partner regarding the patrol area in determining the best route for transit. Such a partner may consider factors other than the fastest and most direct route for travel and base the recommendations on safety factors. As a result, an officer may rely on his/her partner for advice concerning the best speed with which to navigate a particular portion of a route.

In addition to directions regarding a route for travel, an officer also wishes to receive information concerning a call for assistance. Such information is usually relayed over a radio to the officers in the vehicle, and when such information is relayed concurrent with the verbal relay of driving directions, such information can be lost. These problems indicate a need for a more efficient means of dispatch and selection of information in law enforcement applications and it is the task of the present invention to address these needs.

SUMMARY OF THE INVENTION

According to one aspect of the invention, a navigation apparatus is provided which may be used by law enforcement personnel for rapid intervention to a location while adding safety and reliability to the process. The apparatus includes a computer system, having an operating system, memory and a user interface. The system further includes a positioning system, such as a GPS system for determining the position of a vehicle. The positioning system communicates with the operating system. An information database, communicating with the operating system, contains at least one datum related to routing information concerning routes for travel by the vehicle. The routing information includes safety information concerning route safety in the traveling region accessible by the vehicle. The apparatus further includes a routing system in communication with the operating system that determines a route based at least in part on the routing information.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
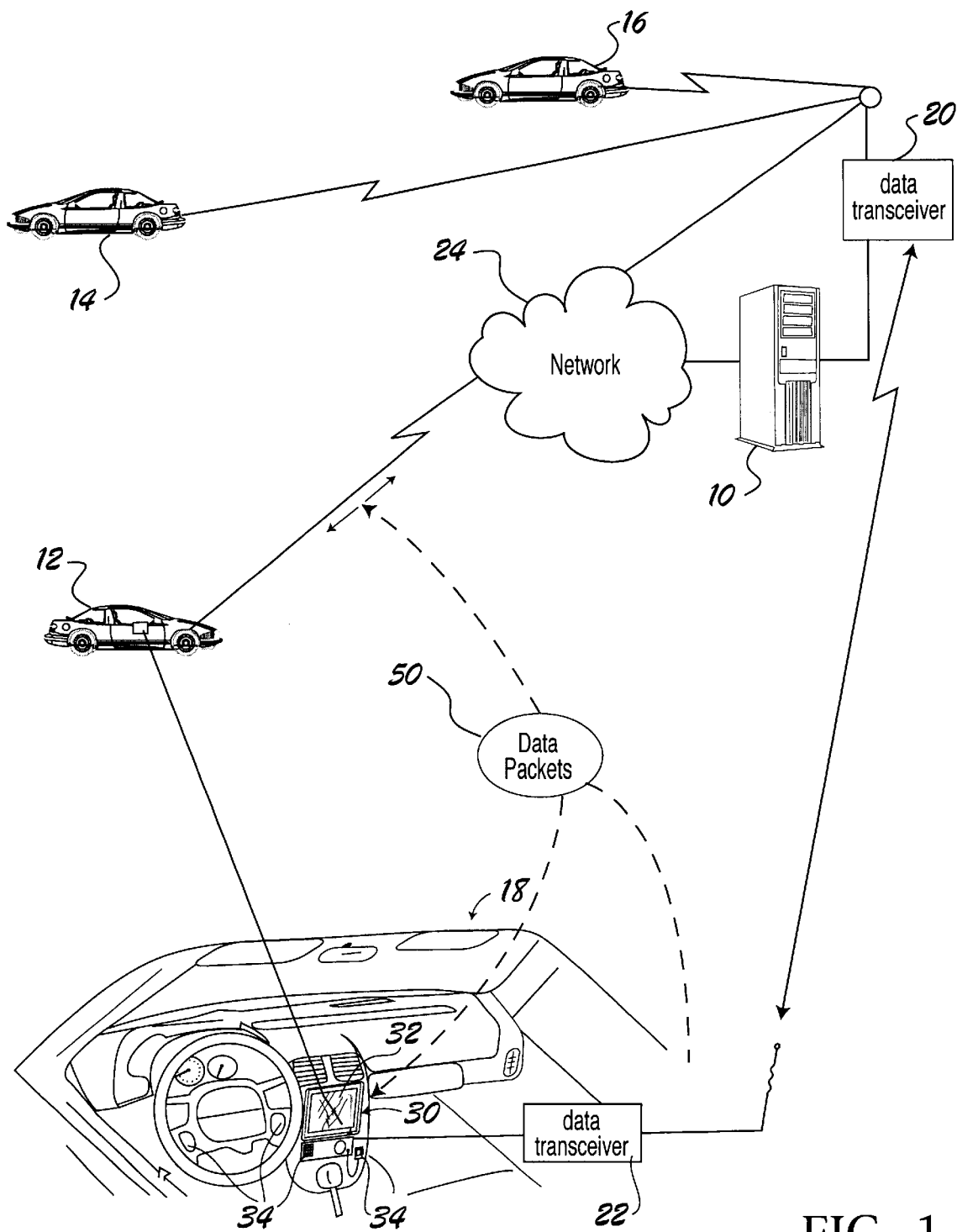
FIG. 1 is a communication diagram illustrating an exemplary client-server implementation of the dispatch system of the invention.

Referring to FIG. 1, the presently preferred embodiment employs the client-server system that includes one or more dispatch servers such as server 10 and one or more client applications running on computer systems within the police officers' vehicles. In FIG. 1, three vehicles 12, 14 and 16 are shown diagrammatically and a fourth vehicle 18 is shown in greater detail to reveal some of the components of the client system. The servers and client systems preferably communicate wirelessly with one another. Thus server 10 has an associated data transceiver 20 and each vehicle also has an associated transceiver, such as transceiver 22 that is deployed in vehicle 18. As will be more fully explained, the servers 10 can be coupled to a computer network 24, such as the internet. This allows the servers to obtain additional information from other law enforcement resources.

The presently preferred embodiment employs a vehicle navigation system 30, which includes a global positioning system (GPS) to ascertain the position of each vehicle. Preferably the vehicle navigation system includes a display screen 30 on which a map of the relevant geographic territory is displayed. If desired, the screen can be touch sensitive, to allow the officer to express his or her intention to respond to a call by touching the location on the map that corresponds to the call. The system is also speech-enabled. It includes both speech recognition and speech generation equipment, through which the officer can interact verbally. In FIG. 1 a handheld microphone 34 and speaker 36 are depicted. These are used by the speech recognizer and speech generation equipment. Also, the system includes keypad data entry modules 38, through which the officer can enter additional information by typing. Although not illustrated in FIG. 1, the system can also be used with a conventional keyboard to allow the officer to type detailed information into the system.

The preferred embodiment passes data between servers and clients using data packets, illustrated diagrammatically in FIG. 1 at 50. These data packets contain data objects by which the server communicates the nature of each call and pertinent routing information and by which the cars communicate their current position and other physical conditions associated with the vehicle. Although there can be a variety of different data structures used for this purpose, one embodiment employs a data object to embed call and route information and a car object to embed physical properties associated with each vehicle. Table I illustrates an exemplary data structure for the data object and car object.

TABLE I

Data Object

Call
  Suspect
    Attributes
      Safe/Dangerous
  Location
    Attributes
      Close/Far
  Data/Time
  Database
    Warrants
    Stolen
Route
  XYZ
  Traffic Condition
    Attributes
      Light/Heavy
      Traffic Lights
  Map
  Other Cars
    Attributes
      Moving
      Arrived Car Object Position
Route
Call Responding to
Speed
Current Conditions
  Road Conditions
  Traffic Conditions As illustrated in the above Table I, the data object contains separate components in which information about the call and route are stored. In the data structure the call may include the identity of a suspect, with any attributes about the suspect (e.g., the suspect is safe/dangerous). The call structure also includes information regarding the location to which the officer should respond. If desired, attributes can be appended to the location data, to indicate whether the location is close to or far from one or more predefined points. To give the data object flexibility to store a variety of different types of information, the call object may also include a database component in which information from other sources can be communicated. For example, if the suspect has any previous warrants outstanding, that information can be obtained from law enforcement resources and provided in the database component of the call object. Similarly, if the call involves a stolen vehicle, that information can be ascertained from motor vehicle data and provided as well.

The system is designed so that information can be communicated to the officers as it is made available. Thus it is not necessary to have all components of the data object fully populated before the data object is sent to the vehicles by the dispatch server. Often, an initial call will come in to the switchboard and will be dispatched to the officers while additional background information is being researched and collected. As this information becomes available, it can be sent by further data objects. The objects are identified by the suspect attribute as well as date and time attributes, allowing subsequent information to be supplied to the officers as it becomes available. The client systems are designed to store the data objects in an indexed fashion, allowing additional information to be appended to each call as it is acquired at the dispatch server and sent to the client applications.

The GPS system 30 installed in each vehicle obtains information from global positioning satellites that is used to very accurately fix the location of each vehicle. In the preferred embodiment the GPS system stores graphical images representing a map or maps of the jurisdiction covered by the officers of a given police force. The static map data is supplemented by traffic condition data, recommended routing data and other data identifying the location of other police cars that may be in a position to respond to the call. The dispatching server collects this information and routes it to each of the vehicles through the route object that comprises a part of the data object illustrated in Table I above. Thus the server can send XYZ data describing the recommended routes that an officer can follow to most quickly and safely reach a given location. The specific route chosen can be altered based on traffic conditions. The traffic conditions may also be displayed on the GPS display 32, allowing the officer to make an independent decision as to which route to take. Traffic conditions embed several attributes, including whether traffic is light or heavy over designated routes and what are the status of traffic lights along that route. Knowing traffic conditions and traffic light patterns can assist an officer in reaching the destination quickly.

The route object is also capable of delivering new map data to the vehicle. While the map data is usually stored locally, in some instances it can be desirable to provide new map data, such as when the officer must travel outside the normal jurisdiction and may not have a full set of local maps resident in the system.

The route object also can convey information about other police vehicles, including their location and other attributes such as whether they are moving towards the destination corresponding to the call and whether they have already arrived there. Knowing this information is helpful to inform the officers responding to a call whether they will be the first to arrive or whether they will be providing backup to officers that have already arrived.

The dispatch server populates the data object with information as it becomes available. Traffic condition information, for example, may be provided by the officers themselves. The speed at which the officers' vehicles are traveling is one indicia of traffic or weather conditions (e.g., 10 mph on an interstate freeway implies heavy traffic or poor weather conditions.) Alternatively, it may be provided by camera systems deployed at street intersections.

The car object, depicted in Table I above, is primarily used to convey information about each police vehicle back to the dispatch server. The car object is also used, as will be more fully discussed below, to control a state machine within the client application software. The state machine controls a variable information filter that regulates what type and how much information is provided to the officer at any given moment.

The car object stores position information, current routing information, vehicle speed information, current road and traffic conditions and an indication as to which call the officer is responding to. Position information is derived from the GPS system. Speed information is derived from the GPS system and also from the speedometer system in the vehicle. Current conditions such as road conditions and traffic conditions are provided by the officer either through speech input or through keypad or touch-screen input. When the officer elects to respond to a certain call, by speech input, keypad input or by touching the location of the call on the GPS display screen, that information is stored in the car object to be sent to the dispatch server. In the presently preferred embodiment the route that each vehicle is currently following is inferred by intersecting the vehicle position data with the map data.

Figure 2:
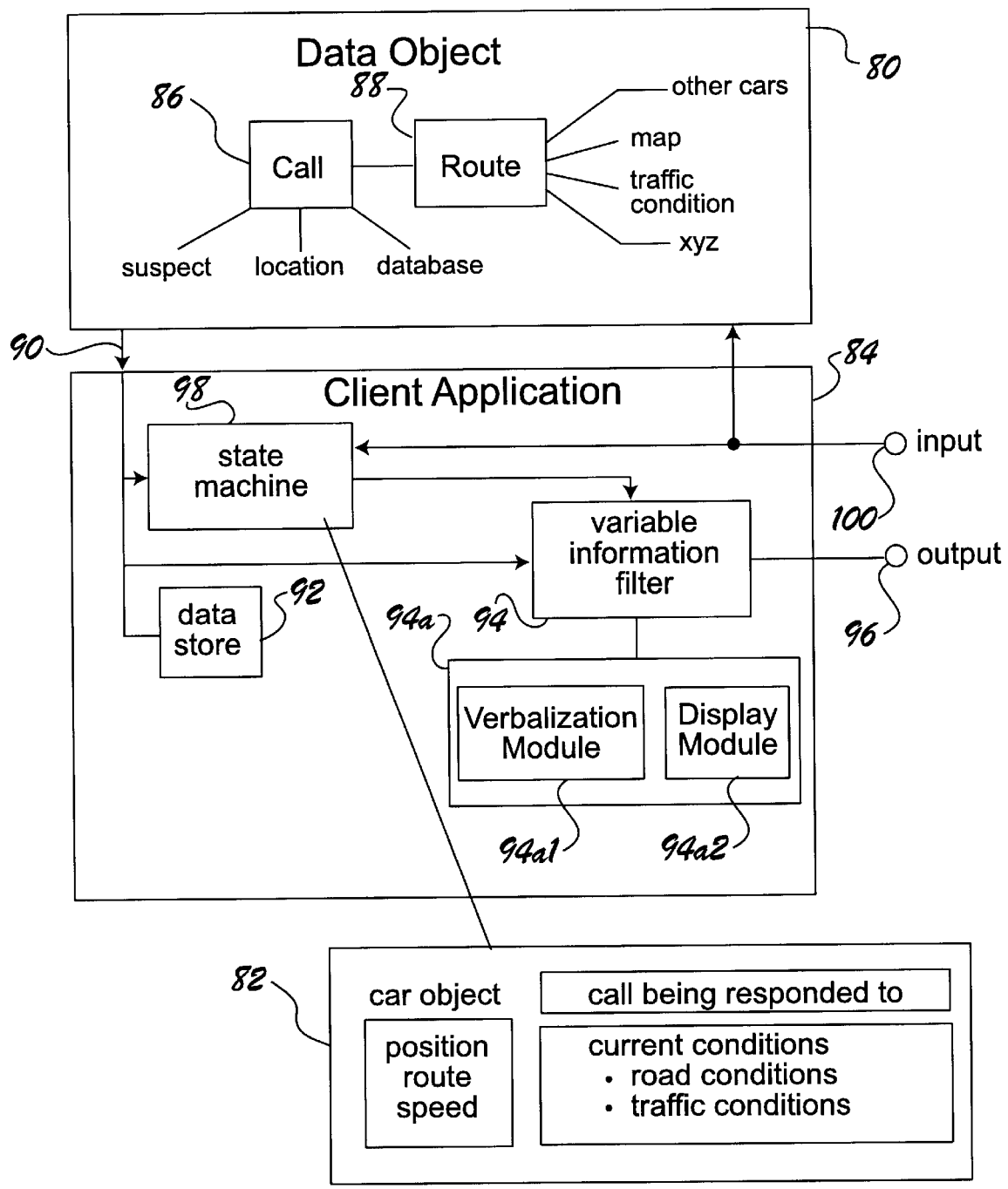
FIG. 2 is a block diagram illustrating the data object and car object data structures and how they interact with the client application.

FIG. 2 shows how the data object 80 and the car object 82 interact with the client application 84 on board each police vehicle. Each incoming data object, which has a structure for storing associated call objects 86 and route objects 88, is supplied to the client application via wireless communication over link 90. The data object is stored within data store 92. As discussed above, data objects are stored so that all information pertaining to a particular call are associated together. Besides being stored, certain information within data object 80 may be provided directly to the officer, either by display on the GPS screen or by speech output or both.

Because having too much information can sometimes be more confusing than helpful, the system employs a variable information filter 94. Thus information from data object 80 passes through filter 94 before being supplied to the officer via the output port 96. A state machine 98 controls the setting of the variable information filter. State machine 98 is in turn controlled by data extracted from data object 80 as well as input information supplied through port 100 by the police officer or by the onboard systems within the vehicle. Thus, for example, if the vehicle is travelling at high speed (as determined by the vehicle speedometer) the state machine 98 may set the variable information filter 94 so that navigation instructions are given more quickly and succinctly. Filter modules 94a include a verbalization module 94a1 and a display module 94a2. The purpose of the verbalization module 94a1 is to present information verbally to the user. Based on the urgency and verbosity needed, the verbal rendering of the information may be very different. Thus, when the vehicle is traveling at 20 miles per hour, the navigation system might announce to the officer, "you are approaching your next right turn in 500 meters." On the other hand, if the vehicle is travelling at 70 miles per hour, the navigation system might instruct the officer more curtly, "Turn right here!" Similarly, the purpose of the display module is to present information visually to the user and other means are employed. For instance, summarization, prioritization to provide critical information first, and highlighting of critical information may be employed.

The state machine 98 might make use of information from data object 80 in a similar fashion. For example, if the suspect is armed and dangerous, that information is extracted from data object 80 (specifically from call object 86 within data object 80) and provided to state machine 98. The variable information filter 94 then would supply a higher degree of safety information to the officer. For example, if the suspect is armed and dangerous, and if no other officers have yet arrived at the scene, the variable information filter might advise the officer that he or she is first to arrive and might also keep that officer advised as to the location of other backup vehicles. On the other hand, if the suspect is not armed and dangerous, the location of additional vehicles would not be necessary and would be screened out by the variable information filter 94.

The system is designed to provide the proper information content and quantity under varying conditions. The information is communicated multimodally, through both visual and audible format. The variable information filter is capable of providing different information via the different communication modes as displayed at the filter modules 94a. Thus the location of other officers' vehicles might be displayed on the display screen even though such information might be screened out of the audible information content under a given set of conditions.

Figure 3:
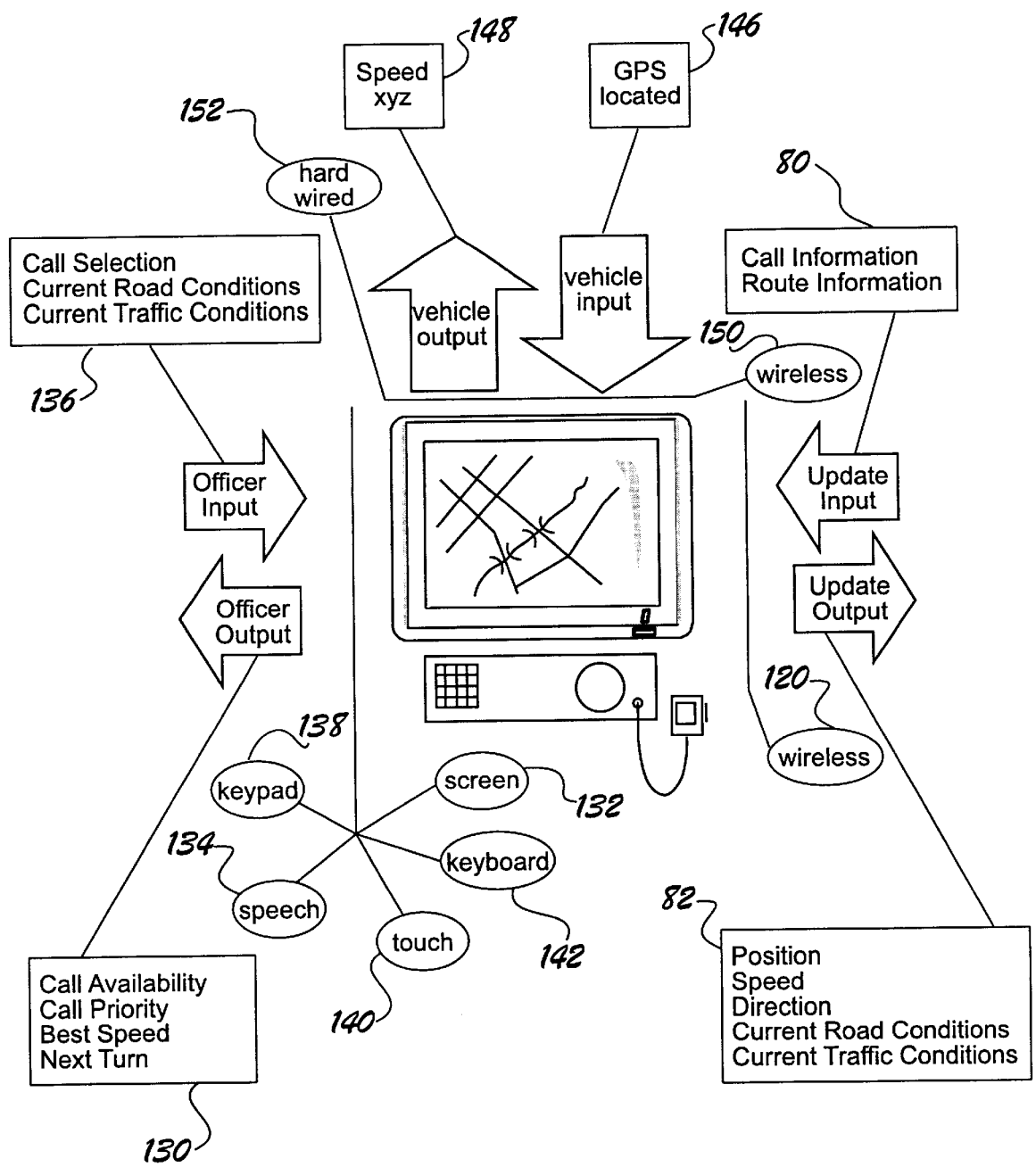
FIG. 3 is an interface diagram, depicting how information flows in a presently preferred embodiment.

FIG. 3 illustrates diagrammatically how the presently preferred system allocates the collection and dissemination of information. The call information and route information are updated to the client system (which includes the GPS system 30) using the data objects 80 previously discussed. These data objects are communicated wirelessly as depicted diagrammatically by the wireless interface 120. Vehicle position, speed, direction as well as current road and traffic conditions are provided via the car object 82. This information is also communicated through the wireless interface 120. Thus in the preferred embodiment the update input information and update output information, corresponding to data objects 80 and 82, are provided wirelessly through wireless interface 120.

Information about what calls the officer may respond to, and the recommended navigation instructions represent officer output content 130 that are provided via the visual screen interface 132 and also via the speech interface 134. The officer can provide input information 136, such as which call the officer wishes to respond to and what the current road and traffic conditions are, via both the speech interface 134 and the manual interfaces, which include keypad interface 138, touch screen interface 140 and optional keyboard interface 142.

The client system also obtains some additional information from external systems, including GPS location information 146, vehicle speed and map coordinate (XYZ) information 148. The GPS location information is obtained through a wireless interface 150, specifically by communication with a GPS satellite. The speed information may be obtained through a hard wired interface 152 or through a wireless interface, such as a blue tooth interface. The map coordinate information is a calculated value derived from GPS location information 146.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A navigation apparatus for use in dispatch of law enforcement personnel, the apparatus comprising:
    an operating system;
    a memory in communication with said operating system;
    a user interface in communication with said operating system;
    a positioning means for determining the position of at least one vehicle in communication with said operating system;
    an information database in communication with said operating system containing at least one datum related to routing information concerning routes for travel by vehicle in a traveling region accessible to travel by vehicle, wherein the routing information includes at least safety information concerning route safety in the traveling region;

a routing means in communication with said operating system for determining a determined route based at least in part on the routing information; and an information selection means in communication with said operating system for selecting information, wherein said information selection means is managed by said operating system in a manner permitting selection of useful information for useful communication to the user through a secondary communications means, and selection of prioritized information for prioritized communication to the user through a primary communications means, wherein the prioritized communication occurs in a non-interference manner permitting the priority-based communication of higher priority information without interference from lower priority information, wherein said operating system manages said memory, said user interface, said positioning means, said information database, and said routing means in a manner permitting a safety-accountable determination of at least one determined route using the safety information in the safety-accountable determination.

2. The navigation apparatus of claim 1, wherein the safety information includes at least one of accident history, road conditions, and weather conditions.

3. The navigation apparatus of claim 1, further comprising at least one of a tracking means in communication with said operating system, wherein said tracking means is managed by said operating system for at least one of inserting new routing information into the information database and altering existing routing information in the information database based at least in part on the new routing information, and an information sharing means in communication with said operating system wherein said information sharing means is managed by said operating system for sharing information with an additional apparatus.

4. A method for selecting information for communication in a dispatch and navigation system for law enforcement personnel, the method comprising:

communicating initial information to an information selector;

selecting prioritized information including at least higher priority information and lower priority information for communication to a primary communications means for prioritized communication to a user; and selecting useful information for communication to a secondary communications means for useful communication to the user, wherein the prioritized communication occurs in a non-interference manner permitting the priority-based communication of higher priority information without interference from lower priority information.

5. The method of claim 4, wherein the initial information includes at least one of navigation information for navigating a travelling route for travel by vehicle through a travelling region accessible to travel by vehicle and call information relating to a call for assistance.

6. The method of claim 5, wherein the higher priority information includes at least one navigation maneuver for navigating the travelling route.

7. The method of claim 5, wherein the lower priority information includes at least one of preparation information relating to preparation for the navigation maneuver and important call information relating to the call for assistance.

8. The method of claim 5, wherein the useful information includes at least useful call information relating to the call for assistance.

9. The method of claim 4, wherein the primary communications means includes a speech generation means.

10. The method of claim 4, wherein the secondary communications means includes a display means.

11. A navigation apparatus for use in dispatch of law enforcement personnel, the apparatus comprising:

an operating system;

a memory in communication with said operating system;

a primary communications means in communication with said operating system for communicating information to a user;

a secondary communications means in communication with said operating system for communicating information to the user;

an information database in communication with said operating system containing initial information; and an information selection means in communication with said operating system for selecting information, wherein said operating system manages said memory, said primary communications means, said secondary communications means, said information database, and said information selection means in a manner permitting selection of useful information for useful communication to the user through said secondary communications means, and selection of prioritized information for prioritized communication to the user through said primary communications means, wherein the prioritized communication occurs in a non-interference manner permitting the priority-based communication of higher priority information without interference from lower priority information.

12. The navigation apparatus of claim 11, wherein the initial information includes at least one of navigation information for navigating a travelling route for travel by vehicle through a travelling region accessible to travel by vehicle and call information relating to a call for assistance.

13. The navigation apparatus of claim 12, wherein the higher priority information includes at least one navigation maneuver for navigating the travelling route.

14. The navigation apparatus of claim 12, wherein the lower priority information includes at least one of preparation information relating to preparation for the navigation maneuver and important call information relating to the call for assistance.

15. The navigation apparatus of claim 12, wherein the useful information includes at least useful call information relating to the call for assistance.

16. The navigation apparatus of claim 11, wherein said primary communications means includes a speech generation means.

17. The navigation apparatus of claim 11, wherein said secondary communications means includes a display means.

18. A navigation apparatus for use in dispatch of law enforcement personnel, the apparatus comprising:

an operating system;

a memory in communication with said operating system;

a user interface in communication with said operating system;

a positioning means for determining the position of at least one vehicle of an officer in communication with said operating system;

an information database in communication with said operating system containing at least one datum related to routing information concerning routes for travel by vehicle in a traveling region accessible to travel by vehicle, wherein the routing information includes at least safety information concerning route safety in the traveling region;

a routing means in communication with said operating system for determining a determined route based at least in part on the routing information; and a wireless interface outputting routing information to vehicles of other officers and receiving routing information from vehicles of other officers, wherein the routing information includes at least one of road conditions and traffic conditions, thereby informing said information database, wherein said operating system manages said memory, said user interface, said positioning means, said information database, and said routing means in a manner permitting a safety-accountable determination of at least one determined route using the safety information in the safety-accountable determination.

19. The navigation apparatus of claim 18, further comprising an information sharing means in communication with said operating system, wherein said information sharing means is managed by said operating system for sharing information with an additional apparatus.

20. The navigation apparatus of claim 19, further comprising an information selection means in communication with said operating system for selecting information, wherein said information selection means is managed by said operating system in a manner permitting selection of useful information for useful communication to the user through a secondary communications means, and selection of prioritized information for prioritized communication to the user through a primary communications means, wherein the prioritized communication occurs in a non-interference manner permitting the priority-based communication of higher priority information without interference from lower priority information.

21. The navigation apparatus of claim 18, wherein the routing information includes at least safety information concerning route safety in the travelling region.

* * * * *